United States Patent [19]

Nanda et al.

[11] Patent Number: 6,038,645

[45] Date of Patent: Mar. 14, 2000

[54] MICROPROCESSOR CIRCUITS, SYSTEMS, AND METHODS USING A COMBINED WRITEBACK QUEUE AND VICTIM CACHE

[75] Inventors: Ashwini K. Nanda, Mohegan Lake, N.Y.; Jonathan H. Shiell, Plano, Tex.

[73] Assignee: Texas Instruments Incorporated, Dallas, Tex.

[21] Appl. No.: 08/919,732

[22] Filed: Aug. 28, 1997

Related U.S. Application Data

[60] Provisional application No. 60/024,860, Aug. 28, 1996.

[51] Int. Cl.[7] .................................................... G06F 12/08
[52] U.S. Cl. ......................... 711/141; 711/133; 711/140; 711/142; 711/143; 711/144; 711/145
[58] Field of Search ..................................... 711/140, 141, 711/142, 143, 144, 146, 133, 134, 136, 137, 138, 118, 122

[56] References Cited

U.S. PATENT DOCUMENTS

| | | | |
|---|---|---|---|
| 5,467,460 | 11/1995 | Patel ........................................ | 711/143 |
| 5,526,508 | 6/1996 | Park et al. ............................... | 711/122 |
| 5,526,510 | 6/1996 | Akkary et al. ........................... | 711/133 |
| 5,581,729 | 12/1996 | Nishtala et al. ......................... | 711/143 |
| 5,642,494 | 6/1997 | Wang et al. ............................. | 711/140 |
| 5,659,709 | 8/1997 | Quach ..................................... | 711/146 |
| 5,684,977 | 11/1997 | Van Loo et al. ........................ | 711/143 |
| 5,809,524 | 9/1998 | Singh et al. ............................. | 711/118 |

*Primary Examiner*—Eddie P. Chan
*Assistant Examiner*—Than Nguyen
*Attorney, Agent, or Firm*—Robert D. Marshall, Jr.; Gerald E. Laws; Richard L. Donaldson

[57] ABSTRACT

A microprocessor (10) comprising a central processor unit core (12) operable to write information during a write cycle and a cache circuit (18) coupled to the central processor unit core and operable to evict information. The microprocessor further includes a combined storage queue (16) coupled to the central processor unit core and to the cache circuit. The combined storage queue includes a set of logical storage blocks (22c) which is operable to store both information written by the central processor unit core and information evicted by the cache circuit. Other circuits, systems, and methods are also disclosed and claimed.

32 Claims, 5 Drawing Sheets

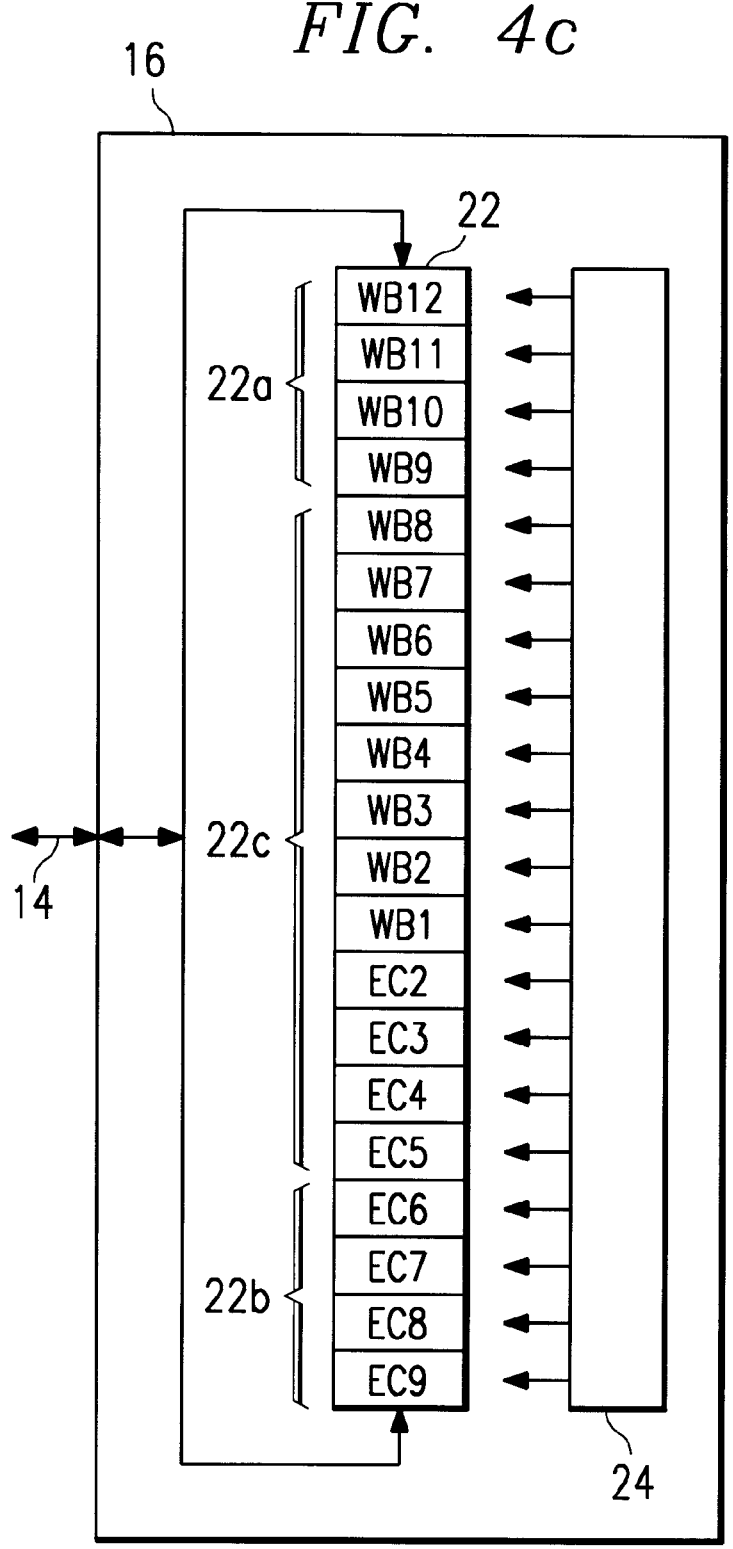

MICROPROCESSOR CIRCUITS, SYSTEMS, AND METHODS USING A COMBINED WRITEBACK QUEUE AND VICTIM CACHE

This application claims priority under 35 U.S.C. 119(e)(1) of the provisional application number 60/024,860 filed Aug. 28, 1996.

TECHNICAL FIELD OF THE INVENTION

The present embodiments relate to information storage in microprocessors, and are more particularly directed to microprocessor circuits, systems, and methods using a combined writeback queue and victim cache.

BACKGROUND OF THE INVENTION

Microprocessor technology continues to advance at a rapid pace, with consideration given to all aspects of design. Designers constantly strive to increase performance, while maximizing efficiency. With respect to performance, greater overall microprocessor speed is achieved by improving the speed of various related and unrelated microprocessor circuits and operations, including parallel and out-of-order operations. With respect to efficiency, the size of the microprocessor integrated circuit is constantly scrutinized to produce a smaller and, therefore, more efficient device. The present embodiments provide enhancements in both of these areas, as well as others which will be appreciated by a person skilled in the art.

The present embodiments relate in general to microprocessors, and are more specifically directed to information storage in such devices. Microprocessor technology to date has included various approaches to information storage. For example, a common current microprocessor includes various hierarchical levels of storage, beginning at the lowest level using registers, ascending through one or more levels of queues and/or caches, and up to some high level storage such as large memory structures which are both on and off the same integrated circuit which forms the microprocessor. Many of these varying levels represent various benefits, but each often also includes some drawbacks, such as added complexity, added area on the integrated circuit, inflexibility in size, and so forth.

In view of the above, the present inventors address the drawbacks of certain prior microprocessor information storage circuits, as demonstrated below.

SUMMARY OF THE INVENTION

In one embodiment, there is a microprocessor comprising a central processor unit core operable to write information during a write cycle and a cache circuit coupled to the central processor unit core and operable to evict information. The microprocessor further includes a combined storage queue coupled to the central processor unit core and to the cache circuit. The combined storage queue includes a set of logical storage blocks operable to store both information written by the central processor unit core and information evicted by the cache circuit. Other circuits, systems, and methods are also disclosed and claimed.

BRIEF DESCRIPTION OF THE DRAWINGS

FIG. 4c illustrates the combined storage queue of FIG. 4a after storing additional evicted cache information and evicting the least-recently-stored evicted cache information.

DETAILED DESCRIPTION OF THE PREFERRED EMBODIMENTS

Figure 1:
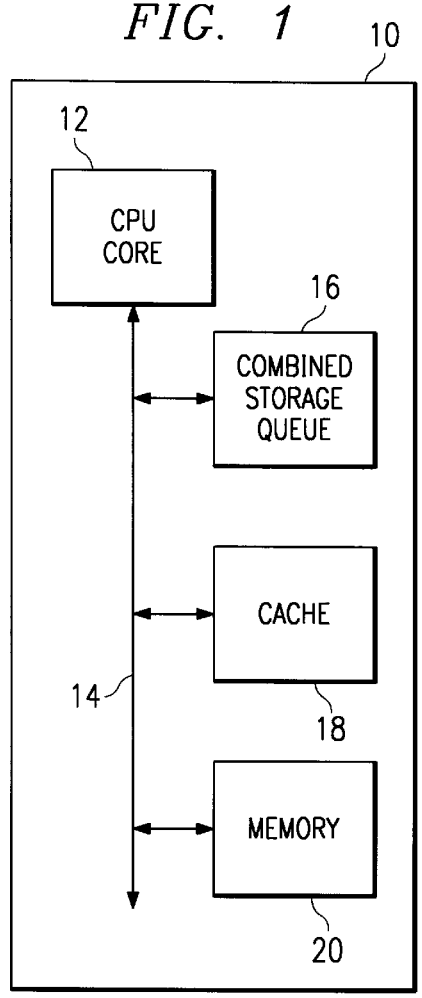
FIG. 1 illustrates a block diagram of various information producing and storing circuits on a microprocessor.

FIG. 1 illustrates a block diagram of various information producing and storing circuits on a microprocessor designated generally at 10. Microprocessor 10 may be of various types of microprocessor structures, and an example of one such structure is detailed below in connection with FIG. 5. At this point, however, various details related to such a microprocessor are neither shown nor explained in order to simplify the present discussion. Instead, such a discussion is deferred until the detailed discussion of FIG. 5, below.

Turning to the blocks shown in FIG. 1, microprocessor 10 includes a central processor unit ("CPU") core 12, which is intended to depict at a minimum the capabilities for manipulating and outputting address and data information. For example, such capabilities may likely include various execution units such as load/store units, arithmetic units, and a floating point unit as well as other circuits appreciated later from the discussion of FIG. 5. CPU core 12 is connected to a bus 14 for communicating information between the blocks of microprocessor 10. More specifically, bus 14 is connected to a combined storage queue 16 which, as detailed below, can be written to, or read from, by other blocks illustrated in FIG. 1. Bus 14 is further connected to a cache 18, which may be any type of cache known in the art, such as a fully associative cache, a direct mapped cache, or a set associative cache. Moreover, cache 18 may represent any level of a cache structure, but is higher in the memory hierarchy than combined storage queue 16. Lastly, bus 14 is connected to a memory 20. Memory 20 may represent any type of microprocessor-type memory as known in the art, including on-chip and off-chip memories. Moreover, memory 20 is higher in the memory hierarchy than cache 18 (and, therefore, is also higher in the memory hierarchy than combined storage queue 16).

A detailed understanding of the operation of the blocks shown in FIG. 1 is better obtained given the discussion of combined storage queue 16 in FIGS. 2 through 4c. At this point, however, note that CPU core 12 interacts with cache 18 and memory 20 generally as in the art, with the exception of the additional aspects provided by the inclusion of combined storage queue 16 as demonstrated below. Generally, therefore, CPU core 12 processes instructions over various stages. One of these stages includes a write cycle, which is often referred to as a writeback stage (which sometimes occurs at the same time as the last stage of instruction processing, or other times occurs earlier than that last stage). By the conclusion of the writeback stage, CPU core 12 outputs information, which is intended to be written to at least one level of the microprocessor storage system.

This information is referred to in the art as writeback information, and that same understood term will be used throughout this document. Writeback information may be communicated in various manners to some storage system. For example, this information may be written to a register. As another example, the information may be written back to cache 18 alone, or written through cache 18 to memory 20. Note that these last two mentioned options are write policies known in the art, referred to in connection with a cache as either a writeback or a write through cache. In a write through cache, the information is written to both a block in the cache as well as to a memory system higher than the cache. In a writeback cache (also sometimes called copy back or store in), the information is written only to a block in the cache, and the modified cache block is later written to a higher memory system when the cache block is replaced in the cache. Still further, some systems, such as the INTEL 80x86 system, follow a write through once, writeback thereafter system which combines these techniques such that a first write is through the cache and subsequent writes to the same block are only to the block with the higher memory receiving the information later once the modified block is evicted from the cache. In all events, these principles as well as various other cache features such as write allocation and the MESI standard may be implemented with respect to cache 18 as well. Moreover, although FIG. 1 depicts only a single cache level, microprocessor 10 could include multiple cache levels as known in the art.

In contrast to the above-described known features, and as a brief introduction to the operation of combined storage queue 16, note that queue 16 operates to store two types of information, namely, writeback information as output by CPU core 12 and cache information evicted from cache 18 (and/or other levels of caches). The specifics of how this information is stored and the capabilities of combined storage queue 16 are detailed below. Moreover, note that combined storage queue 16 may be ordered at different levels in a memory hierarchy to create different embodiments. For example, combined storage queue 16 could be logically coupled between CPU core 12 and cache 18 for purposes of receiving writeback information directly from CPU core 12, while receiving evicted cache information evicted from cache 18. As another example, combined storage queue 16 could be logically coupled after cache 18 such that writeback information received by combined storage queue 16 would arrive via write through of cache 18 while again queue 16 would receive evicted cache information evicted from cache 18. Still further, in a system with multiple levels of caches (such as is now more common in the art), combined storage queue 16 may be placed at still a higher level between such caches and, indeed, multiple variations of combined storage queue 16 may be placed between successive levels of such multiple caches. These as well as other examples will be appreciated by a person skilled in the art.

Figure 2:
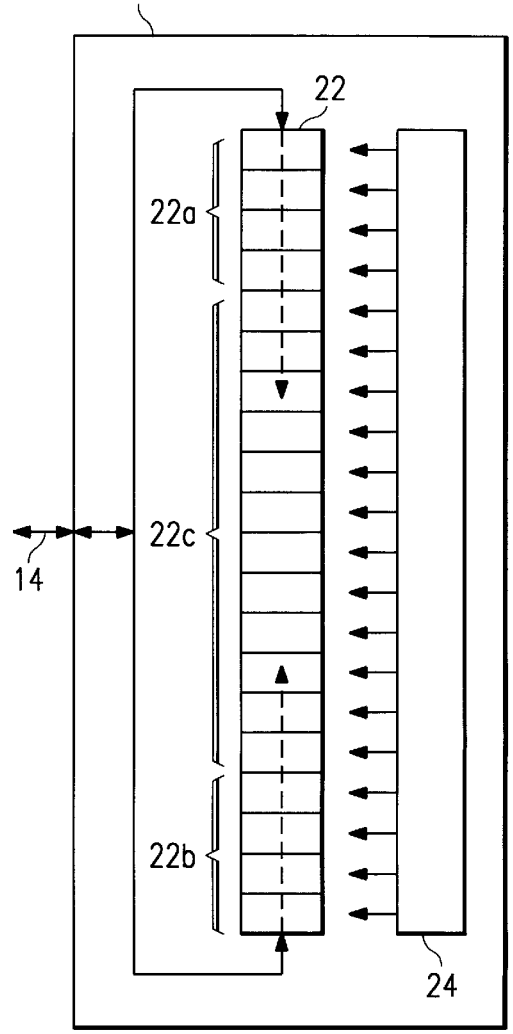
FIG. 2 illustrates a block diagram of the combined storage queue of FIG. 1.

FIG. 2 illustrates a block diagram of one embodiment of combined storage queue 16 in greater detail. Combined storage queue 16 includes a storage circuit 22 which may be written to, or read from, as demonstrated below. Before discussing the specifics of such operations, note that combined storage queue 16 further includes a selection and control circuit 24 coupled to storage circuit 22. Selection and control circuit 24 generally represents a set of pointers and control logic to route information for writing to, or reading from, storage circuit 22 as well as to provide the functionality described below. The specific operation of selection and control circuit 24 is understood with reference to the operational description given below.

Storage circuit 22 in the present embodiment is preferably separated into at least three different logical storage areas, those being shown as storage areas 22a, 22b, and 22c in FIG. 2. Note that it is stated that these are logical storage areas, meaning the actual physical storage cells may not be separated in this manner, but instead at any instance are logically distinguishable from one another; therefore, for purposes of storing different types of data as discussed below, these areas may be discussed as separate areas. Turning then to those areas, each storage area includes a number of blocks capable of storing binary information. This binary information may include data, and preferably various control bits to accomplish the functionality described below. In the preferred embodiment, storage areas 22a and 22b are the same size, and each includes four blocks. Each of these blocks may store a corresponding block of information. Further, storage area 22c preferably includes twelve blocks. Thus, storage circuit 22 in its entirety may store up to twenty blocks of information. Note further that a block of information simply represents an entity of information and not a given size; thus, a block of information in one storage area may differ in size from a block of information in another storage area. Additionally, given the number of blocks in of each of storage areas 22a, 22b, and 22c, recall that the type of information stored in a given area depends on the specific area in which it is stored, as detailed immediately below.

Storage area 22a stores information written by CPU core 12, and this information is introduced above as referred to as writeback information. Moreover, because storage area 22a is dedicated to one type of information, it is from this point forward referred to as dedicated storage area 22a. Given the above, therefore, dedicated storage area 22a may store up to four blocks of writeback information. In this regard dedicated storage area 22a, solely by itself and without additional combinations and functions detailed below, may be thought of as a writeback queue which is known in the art. Particularly, writeback occurs in certain microprocessors whereby a CPU core writes data intended for some memory system, and that data is stored in a writeback queue. From the standpoint of the CPU, storage of the writeback data in the writeback queue frees the CPU to perform its next operation. Typically, such a microprocessor includes additional circuitry to thereafter read the information from the writeback queue and write it to some storage structure which is higher in the storage hierarchy than the queue. In all events, these as well as other writeback queue principles are known in the art, and may be applied to dedicated storage area 22a.

Storage area 22b is written to with information evicted from cache circuit 18. Particularly, it is known in the cache art that a cache evicts information based on various types of procedures. For example, cache structures may evict information in response to either a cache write or a cache read in view of other circumstances. For example, for a CPU load, the information sought by the CPU also may be read into a cache, thereby requiring that a cache block be evicted to free up storage to store the information being read by the CPU. As another example, for a CPU write, and where write allocation is implemented, then a block in the cache is allocated to receive the written information and, therefore, a block is evicted to free up storage space for the allocated block. In addition, regarding the particular information evicted, it may be selected in various manners, such as by evicting the least-recently-used information, or randomly selected information. In any event, at some point information must be removed, or "evicted" as often referred to in the art, from a cache to free a cache block to receive new information. Moreover, it has been proposed in the art to include a dedicated structure on a microprocessor which is typically a small structure to store only a few number of blocks evicted from the cache. Such a structure has been referred to as a victim cache and additional details concerning such a cache may be found in the article by Norman P. Jouppi, dated March 1990, entitled "Improving Direct-Mapped Cache Performance by the Addition of a Small Fully-Associative Cache and Prefetch Buffers", available from the Western Research Laboratory of the DIGITAL company (Palo Alto, Calif.). Once information moves from the cache to the victim cache, if the evicted information is thereafter then sought again from the evicting cache (thereby resulting in a cache miss), the information may then be retrieved from the victim cache without having to access a more complicated, and likely slower, storage circuit located higher in the storage system. Given the above, storage area 22b, solely by itself and without additional combinations and functions detailed below, may be considered a victim cache and, therefore, these as well as other victim cache principles may apply to it as known in the art. Moreover, because storage area 22b is dedicated to one type of information, it is from this point forward referred to as dedicated storage area 22b. Still further, note that the size of each block in dedicated storage area 22b may be the same as a block in the cache associated with storage queue 16 or, in an alternative embodiment, the size of each block may be larger or small than the associated cache. For example, if the size of a block in dedicated storage area 22b is larger than a block within the associated cache, then the storage block is capable of storing multiple blocks from the cache at a time. Note further in such an instance that it is also preferable to include control information based on each block from the cache and, therefore, a given block in dedicated storage area may include multiple sets of control information to correspond to the multiple blocks of information received from the cache.

Storage area 22c stores information from both of storage areas 22a and 22b; thus, storage area 22c stores information either written by CPU core 12 or information evicted from cache circuit 18. Moreover, because either or both of two types of information may be stored in storage area 22c, it is from this point forward referred to as common storage area 22c. As demonstrated in FIGS. 3a through 4b, below, information is preferably stored into common storage area 22c on a first-in-first-out ("FIFO") basis after being written to either dedicated storage area 22a or dedicated storage area 22b. To logically demonstrate this FIFO storage in an introductory manner, dotted arrows are shown on FIG. 2 to represent this flow. Importantly, however, note again that the illustration of FIG. 2 (as well as FIGS. 3a through 4b, below) is of logical, rather than physical, arrangement of the storage blocks and the storage of information in those blocks. In actual operation, it is preferred that information not move between successive storage blocks within storage circuit 22 because such action would slow overall operation. Instead, pointers, flags, or the like may be used within selection and control circuit 24 to keep track of what information is stored in which storage block.

Figure 3A:
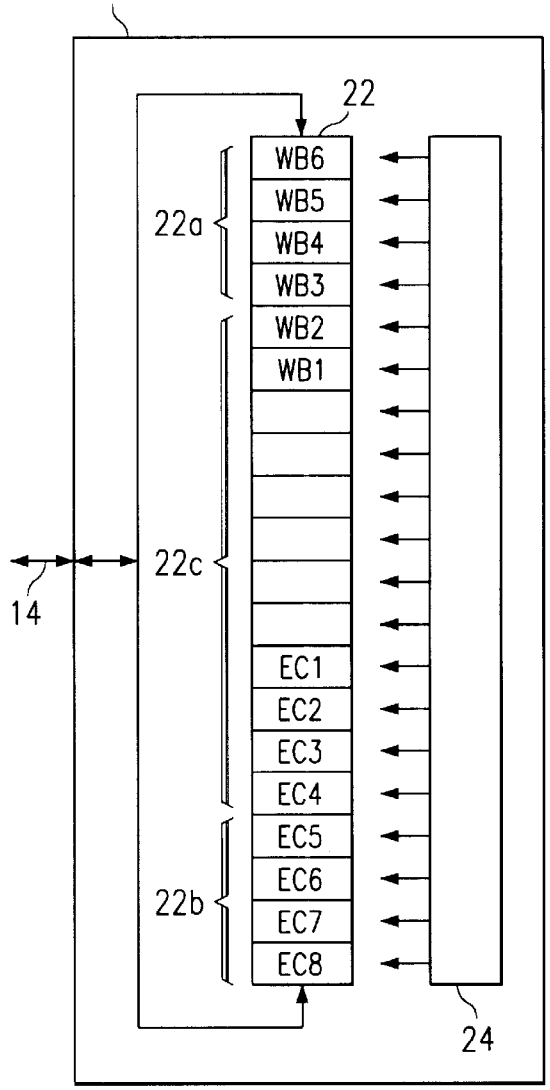
FIG. 3a illustrates an example of writeback and evicted cache information stored in the combined storage queue represented in FIG. 2.

FIG. 3a illustrates combined storage queue 16 of FIG. 2, and further illustrates examples of information stored within each of storage areas 22a, 22b, and 22c. Before discussing those examples, note the following conventions. To depict blocks of writeback information written by CPU core 12 to storage circuit 22, entries using the abbreviation "WB" are shown in FIG. 3a. To depict blocks of evicted cache information output by cache circuit 18 and written to storage circuit 22, entries using the abbreviation "EC" are shown in FIG. 3a. Still further, with respect to both writeback information and evicted cache information, successive numbers immediately follow the abbreviations to depict the sequence in which those blocks were produced from their corresponding source. For example, with respect to writeback information written from CPU core 12, WB1 was written by CPU core 12 before WB2, WB2 was written by CPU core 12 before WB3, and so forth. Similarly, with respect to evicted cache information, EC1 was evicted from cache 18 before EC2, EC2 was evicted from cache 18 before EC3, and so forth.

Turning now to the examples of information stored in combined storage queue 16 in FIG. 3a, note that storage circuit 22 stores a total of six blocks of writeback information and eight blocks of evicted cache information. Because the information is stored logically in a FIFO manner, the four most recent entries for each type of information are within the corresponding dedicated storage area. Thus, with respect to writeback information, WB3 through WB6 are stored in dedicated storage area 22a since they are the four most-recent-written writeback information entries. Similarly, with respect to evicted cache information, EC5 through EC8 are stored in dedicated storage area 22b since they are the four most-recent-evicted cache information entries.

Figure 3B:
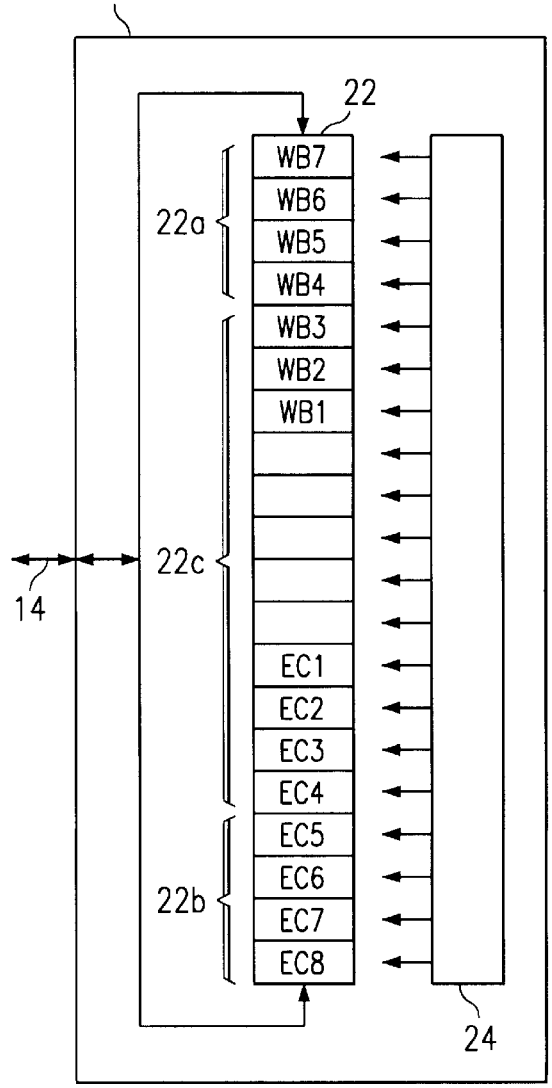
FIG. 3b illustrates the combined storage queue of FIG. 3a after storing additional writeback information.

FIG. 3b, when compared to FIG. 3a, further illustrates the FIFO relationship of both dedicated storage areas 22a and 22b with respect to common storage area 22c. Particularly, FIG. 3b illustrates combined storage queue 16 of FIG. 3a, but after the next successive writeback block, WB7, is written to storage circuit 22. Note various aspects of this operation. First, because of the FIFO nature of storage circuit 22a, WB7 as the most recent writeback information is written into dedicated storage circuit 22a. Second, because dedicated storage circuit 22a only stores up to four blocks of information, the least-recently-stored information from it is logically moved to common storage circuit 22c. In the example of FIG. 3b, therefore, when WB7 is written to dedicated storage area 22a, the location storing WB3 in dedicated storage area 22a is changed to be in common storage area 22c. Again, the information does not actually move, but instead, a pointer or the like associated with selection and control circuit 24 now identifies WB3 as stored in common storage area 22c while WB7 is stored in dedicated storage area 22a. Note also that the same operation shown with respect to writeback information in FIG. 3b also applies to evicted cache information. Thus, if EC9 were evicted from cache circuit 18, it would be stored to dedicated storage area 22b while EC5 would be stored to a location corresponding to common storage area 22c.

Given the above operation, note various principles and advantages of combined storage queue 16. First, for either writeback or evicted cache information, note that the above operation maintains the four most recent entries in each dedicated storage area. Thus, there are a guaranteed number of blocks reserved to store both writeback or evicted cache information. Second, note that common storage area 22c provides dynamic changing of the available resources for storing either writeback or evicted cache information. For example, if only four blocks of writeback information are stored, then up to sixteen blocks of evicted cache information also may be stored to the same storage circuit 22. Similarly, if only four blocks of evicted cache information are stored, then up to sixteen blocks of writeback also may be stored to the same storage circuit 22. Moreover, any combination of the number of blocks also may be combined, so long as at least four blocks are reserved for each type of information, and so long as the total number of stored blocks does not exceed twenty blocks of information. Moreover, both the limit of four dedicated blocks or the limit of sixteen common blocks may be adjusted by a person skilled in the art. Indeed, still further advantages will be appreciated by a person skilled in the art, particularly in view of the additional aspects as detailed below.

Figure 4A:
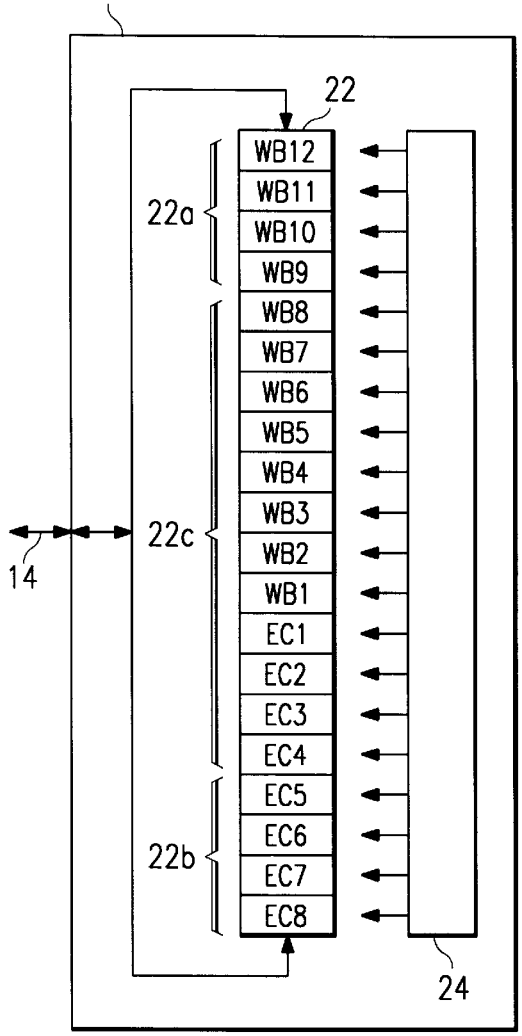
FIG. 4a illustrates an example of writeback and evicted cache information stored in the combined storage queue represented in FIG. 2 where the entire queue stores information.
Figure 4B:
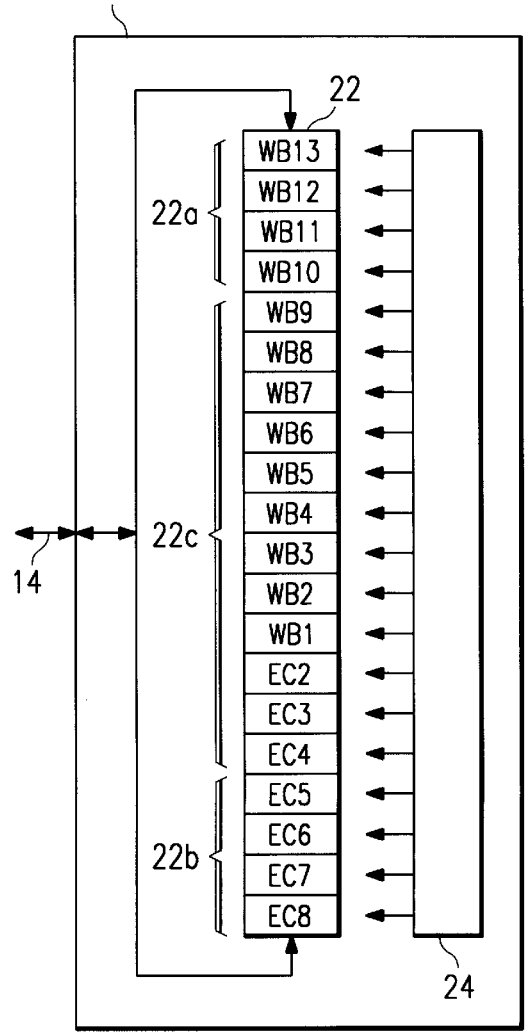
FIG. 4b illustrates the combined storage queue of FIG. 4a after storing additional writeback information and evicting the least-recently-stored evicted cache information.

FIGS. 4a through 4c further illustrate operation of combined storage queue 16 in connection with eviction priority principles once each block of common storage area 22c stores information, and a next information block is received. In this regard, FIG. 4a illustrates an example where twelve blocks of writeback information (i.e., WB1 through WB12) have been written to storage circuit 22 in the manner described above while eight blocks of evicted cache information (i.e., EC1 through EC8) likewise have been written to storage circuit 22. Thus, from FIG. 4a, note that each of the storage blocks within common storage area 22c stores information.

FIG. 4b illustrates combined storage queue 16 of FIG. 4a after receiving an additional block of writeback information, namely, WB13. Specifically, when WB13 is entered in a FIFO manner to dedicated storage area 22a, three blocks of writeback information logically shift forward in dedicated storage area 22a, and the remaining writeback information block logically shifts forward into common storage area 22c. However, because common storage area 22b is full, a block of data must be evicted from storage circuit 22. In this regard, FIG. 4b demonstrates (when compared to FIG. 4a) that the storage of WB13 to storage circuit 22 causes EC1 to be evicted from common storage area 22c. Thus, FIG. 4b demonstrates that in the preferred embodiment writeback information entered into storage circuit 22 receives priority over the least-recently-stored evicted cache information.

Given the above priority of writeback information over evicted cache information, note that this operation is preferable to reduce the possibility that the microprocessor may stall while waiting for already-produced writeback information. Nevertheless, note further that dedicated storage area 22b still ensures that at least some number of blocks of evicted cache information (i.e., four blocks in the described embodiment) are preserved regardless of the number of blocks of writeback information to be written to storage circuit 22. For example, continuing with FIG. 4b, if three more blocks of writeback information (i.e., WB14 through WB16) were stored to storage circuit 22, then common storage area 22c would store at that point only blocks of writeback information. Nevertheless, if yet another block of writeback information arrived for storage (i.e., WB17), queue 16 would not evict yet another block of evicted cache information. Instead, the least-recently-stored block of writeback information (i.e., WB1) would be required to be read out from common storage area 22c to some higher level of storage; note also that the microprocessor preferably stalls at this point until the writeback information may be read out from common storage area 22c. Once WB1 is read in this manner, WB17 is added to dedicated storage area 22a, with the remaining blocks of writeback information shifting forward in the same manner described above.

While the above operation describes priority effects once the entirety of common storage area 22c stores information, note further that while information may be written to storage circuit 22 as described above, it also may be read from storage circuit 22 in a manner comparable to the reading of information either from a prior art writeback queue or a prior art victim cache. For example, in a microprocessor using a write through cache, it is known that information written by the CPU often writes through the cache to a higher level memory. In such an instance, if the microprocessor also includes a prior art writeback queue, then the queue temporarily stores information and that information thereafter is transferred to the write through cache (and the higher level memory). In this same manner, writeback information from common storage area 22c may be read from storage circuit 22 and written through a cache, and such reading from storage circuit 22 again is on a FIFO basis. Thus, if writeback information is read from common storage area 22c in this manner, more blocks are made available in storage circuit 22 to store newly arriving blocks of information without having to evict blocks already stored in common storage area 22c.

FIG. 4c illustrates combined storage queue 16, when contrasted to FIG. 4a, after receiving an additional block of evicted cache information, namely, EC9. When EC9 is written in a FIFO manner to dedicated storage area 22b, three blocks of evicted cache information logically shift forward in dedicated storage area 22b, and all except one block of the remaining evicted cache information logically shifts forward in common storage area 22c. Again, because common storage area 22c is full, a block of data must be evicted from storage circuit 22. FIG. 4c, like FIG. 4b, demonstrates that the storage of EC9 to storage circuit 22 causes EC1 to be evicted from common storage area 22c. Thus, FIG. 4c demonstrates that in the preferred embodiment newly received evicted cache information entered into storage circuit 22 in turn evicts the least-recently-stored evicted cache information, and does not affect (i.e., does not evict) writeback information stored in storage circuit 22.

While the examples of FIGS. 4b and 4c demonstrate eviction from common storage area 22c of earlier-stored evicted cache information, note further that the present embodiments further include an indicator to provide memory coherency in the event of such an eviction. Specifically, recall from the above that various events may cause a block of evicted cache information to be evicted from common storage area 22c. However, it is possible that such information, at the time of eviction, is the only current version of that information, meaning no higher level memory has been updated to match the corresponding information in storage circuit 22. In the cache art, this status is often referred to as dirty cache information. Given the possibility that evicted cache information in storage circuit 22 may be dirty in this manner, it is necessary that, if such information is evicted from storage circuit 22, it is written to some higher level memory system rather than merely discarded. As a result, the present embodiments further include an indicator, such as a dirty bit, that may represent that evicted cache information in combined storage queue 16 is the most recent version of that information and that the corresponding location in a higher memory system has not yet been updated to match that most recent version. Note that this indicator may be embodied in the block of information, or in a corresponding tag or the like associated with selection and control circuit 24. In addition, more than one dirty bit may be used to indicate dirtiness of subsets of information, such as an indication based on bus width, word size, units smaller or larger than a word, and so forth. In any event, given an indication of dirty information, when the evicted cache information in combined storage queue 16 is eventually evicted from common storage area 22c, selection and control circuit 24 provides proper control to ensure that the dirty information is then written to some higher level memory system. Note further that this higher level memory system could be the highest level of system memory, or indeed could be the very cache which earlier evicted the information causing it to be written to combined storage queue 16.

The above described dirty indicator also may be used in the present embodiments to allow "snooping" of combined storage queue 16 as that term is known in the cache art. Specifically, snooping occurs when some part of the microprocessor issues an address and some or all of the system storage devices are snooped to inquire whether they store information corresponding to the issued address. Again, to ensure proper coherency, the most recent version of the information must then be provided in response to the issued address. Given the dirty indicator described above, in response to a snoop (such as to a higher level cache) selection and control circuit 24 detects whether storage circuit 22 stores information corresponding to that address, and whether that information is dirty. If the information is dirty, selection and control circuit 24 issues a control signal indicating that storage queue 16 includes the most current version of the requested information, and that information is thereafter read from storage circuit 22.

The above described dirty indicator also may be used in the present embodiments to alter the above-described prioritization of information in storage circuit 22. Specifically, recall from above that in the described embodiment writeback information has higher priority than evicted cache information, and that evicted cache information is evicted from storage circuit 22 on a FIFO basis. However, with the addition of the dirty indicator, note further that the FIFO eviction of evicted cache information from storage circuit 22 may be further modified so that clean evicted cache information is evicted from storage circuit 22 before dirty evicted cache information is evicted from storage circuit 22. For example, returning to FIG. 4b, recall that it demonstrates eviction of EC1 in favor of WB13. However, suppose further that EC1 is dirty information, while EC2 is clean information (as represented by the corresponding dirty indicator for each block of information). In this event, an alternative embodiment would first evict EC2 from storage circuit 22, thereby leaving EC1 in storage. Given this alternative, when EC2 is evicted in this manner, there is no need to store it to a higher memory system since it is clean information and, therefore, by definition, a copy of it already exists in some higher memory system.

The present embodiments include various other aspects involving storage of information into storage circuit 22 in quantities less than an entire block of information. Specifically, the above discussions demonstrate by way of example the writing and reading of entire blocks of information to and from storage circuit 22. As another feature, however, it is contemplated that in some instances less than a block of information may be written to storage circuit 22. For example, it is stated above that storage circuit 22 preferably includes the capability to store up to twenty blocks of information. In the preferred embodiment, each of these blocks is further addressable to include the same number of bytes as is stored in a block from cache 18. For example, if a block in cache 18 stores either sixteen or thirty-two bytes of information per a given block, then preferably so does storage circuit 22. Given this capability, it is possible that new information may be written to a block without changing the order of that block within storage circuit 22. For example, returning to FIG. 4a, suppose that WB1 was output by CPU core 12 at an earlier time and is now stored in the location shown in FIG. 4a. Therefore, given the FIFO nature of storage circuit 22, WB1 is the next block of writeback information to be read from storage circuit 22. However, before WB1 is read, suppose that CPU core 12 outputs a new byte of writeback information (or more than one byte) and a new block address for that byte. In response, selection and control circuit 24 determines whether the new block address matches the block address of any information stored in storage circuit 22. Assume further, therefore, that the address for the new byte of writeback information corresponds to the address for the block including WB1. As a result, circuit 24 matches the new block address to the WB1 address (i.e., there is an address "hit" for combined storage queue 16). As a result, instead of writing the new byte as part of a new block to dedicated storage area 22a, in the preferred embodiment the block corresponding to WB1 is written (i.e., updated) to include the new byte of writeback information. Consequently, when WB1 is shortly thereafter read from common storage area 22c, it includes this updated information. Given the above, therefore, note that storage circuit 22 permits successive writes from CPU core 12 to be combined. In other words, as shown in the immediately preceding example, from the CPU's standpoint two (or more) writes occur as WB1 is firstly written and the new byte is secondly added to the block including WB1. However, from the standpoint of the memory system higher than combined storage queue 16 it sees only a single write when WB1 is read as a block to the higher memory system. Note further that in the present embodiment each block of information preferably carries with it an indicator representing whether combining in the above-described manner is permissible. For example, if the indicator is set in one state, then combining in the above manner is allowed, whereas if the indicator is set in an opposite state, then combining as such is prohibited. Thus, one skilled in the art will appreciate that this indicator provides the ability to dynamically permit combining in one instance while prohibiting it in another.

The above discussion of combining less than a block of information into a storage block provides, by way of example, combining information of the same type; in other words, the description provides combining a writeback byte (or more than one byte) with a block of writeback information, or of combining a byte of evicted cache information byte (or more than one byte) with a block of evicted cache information. However, in yet another embodiment, note further that writeback information may be combined in a similar manner with evicted cache information stored in storage circuit 22. In this instance, it is first preferable to designate the block to be modified by the combination as a block within common storage area 22c if it is not already so designated. In other words, if the block to be modified is part of dedicated storage area 22b, then it may be otherwise inaccessible for writeback information. Therefore, the appropriate circuitry of selection and control circuit 24 should first change to indicate that the block to be modified is now part of common storage area 22c. Thereafter, it may be modified in the manner described above, that is, by storing the new writeback information to the appropriate location within the block. In addition, note further that the block is preferably thereafter designated by selection and control circuit 24 as writeback information, even though it includes both evicted cache information as well as writeback information. This designation is preferable to ensure that this block, now containing updated information, will receive the above-described priority afforded to writeback information.

Lastly, note two additional considerations with respect to combining less than a block of information into a storage block as described immediately above. First, recall in connection with FIG. 1 that it was stated that combined storage queue 16 may be placed at various different hierarchy levels within the microprocessor. In the instance where combined storage queue 16 is coupled directly to CPU 12 to receive all writeback information, it is more preferable that combining in the above-described manner be permitted. Second, note that as an alternative to allowing combined writing to combined storage queue 16 in the various different manners set forth above, each new byte (or more than one byte) may instead be written to storage circuit 22 as a new block without combining and, therefore, be written in the FIFO manner described above.

Having now discussed various alternative embodiments given the structure set forth in FIGS. 2 through 4c, note that the inventive scope includes still additional embodiments. Moreover, many of the benefits of the above also may be achieved by the following additional examples of alternative embodiments. In one alternative, recall that storage circuit 22 above includes three separate storage areas, that is, dedicated storage areas 22a and 22b, and a common storage area 22c. However, in an alternative embodiment, many of the above aspects may be applied to a storage circuit with only a designated storage area for writeback information and a common storage area. Thus, to accomplish this alternative embodiment, dedicated storage area 22b could be removed from storage circuit 22 of FIG. 2, thereby leaving a storage circuit with twelve blocks of common storage area and four block of a dedicated storage area for writeback information. Indeed, recall in connection with FIG. 1 that it was stated that combined storage queue 16 may be placed at various different hierarchy levels within the microprocessor. In the instance where combined storage queue 16 is coupled directly to CPU 12 to receive all writeback information, it is more preferable that combined storage queue 16 include a dedicated storage area for writeback information. As yet another alternative, both dedicated storage areas 22a and 22b could be removed from storage circuit 22 such that all storage blocks are part of a common storage area, thereby permitting either writeback of evicted cache information to be stored in each of those blocks. For example, in the instance where combined storage queue 16 is coupled farther from CPU 12 such as after some higher level of cache, it may be less desirable to include a dedicated storage area and, thus, instead to provide a single common storage area for both writeback information and evicted cache information. These examples further demonstrate the flexibility and span of the inventive scope, as will be further appreciated by a person skilled in the art.

In addition to the structural variations to create different embodiments discussed above, note further that still other embodiments are contemplated by the present inventors in the context of speculative writeback information. Before discussing such embodiments, a brief introduction of such information is provided. As known in the art, writeback information may be one of two types, namely, speculative writeback information or actual writeback information. Speculative writeback information occurs where the writeback information is issued speculatively as that term is known in the art. More specifically, speculative writeback information corresponds to an instruction which has not fully completed (or "graduated") and, therefore, the information while still in its speculative form should not affect the architected state of the microprocessor. For example, a microprocessor may issue speculative loads in response to a prediction of some future needed data. In contrast, actual writeback information is that which should take its effect on the architected state of the microprocessor.

Given the above discussion, the embodiments as described to this point operate without further modification as to actual writeback information. However, these same embodiments may be further modified to accommodate actual and/or speculative writeback information as follows. With respect to speculative writeback information, it may be stored in combined queue 16 in the same manner as described above with respect to writeback information in general. In addition, however, it is preferred that an additional speculative indicator (i.e., one or more control bits) be associated with such speculative writeback information, such as in connection with selection and control circuit 24, to indicate that the writeback information is speculative. While the writeback information remains marked speculative, it preferably is not combined with other non-speculative information in storage circuit 22. Moreover, if it is evicted, it is treated according to its speculative status, that is, it is not permitted to affect the architected state of the microprocessor. However, if thereafter the instruction corresponding to the speculative writeback information is completed, the control bits may be set to an alternative state indicating that the writeback information is then actual writeback information, in which case it may be treated in the various manners described above. Thus, selection and control circuit 24 preferably includes logic to evaluate the speculative indicator to either allow or prohibit combining based on whether the writeback information is speculative. Note further that to avoid the additional considerations set forth above, an alternative embodiment would merely prohibit speculative writeback information from being stored to combined storage queue 16 and, instead, provide a separate storage structure for such information.

Figure 5:
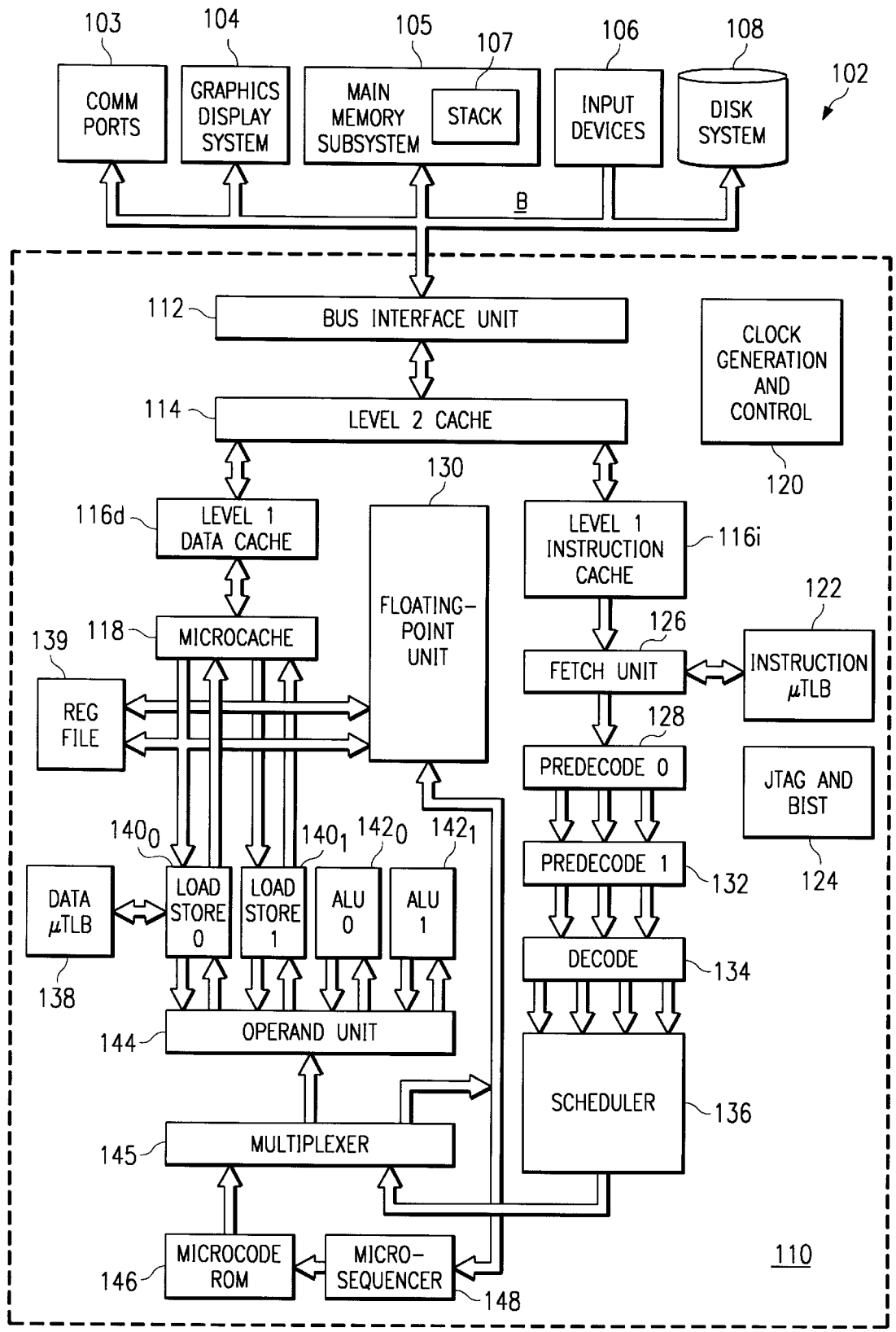
FIG. 5 illustrates an exemplary data processing system within which the preferred embodiments may be implemented.

Having described the above embodiments, FIG. 5 illustrates a block diagram of a microprocessor embodiment into which the above embodiments may be incorporated. FIG. 5 depicts an exemplary data processing system 102, including an exemplary superscalar pipeline microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 110, as shown in FIG. 5, is connected to other system devices by way of bus B. While bus B, in this example, is shown as a single bus, it is of course contemplated that bus B may represent multiple buses having different speeds and hi protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108

(which may include hard disk drives, floppy disk drives, and CD-ROM drives). It is therefore contemplated that system 102 of FIG. 5 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit ("BIU") 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 5, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around level 2 cache 114, by treating certain bus reads and writes as "not cacheable". Level 2 cache 114, as shown in FIG. 5, is connected to two level 1 caches 116; level 1 data cache $116_d$ is dedicated to data, while level 1 instruction cache $116_i$ is dedicated to instructions. Power consumption by microprocessor 110 is minimized by accessing level 2 cache 114 only in the event of cache misses of the appropriate one of the level 1 caches 116. Furthermore, on the data side, microcache 118 is provided as a level 0 cache, which in this example is a fully dual-ported cache.

As shown in FIG. 5 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0$, $142_2$ for processing conditional branch, integer, and logical operations, floating-point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |

-continued

| | |
|---|---|
| SC | Schedule: This stage assigns up to four AOps to the appropriate execution units |
| OP | Operand: This stage retrieves the register and/or memory operands indicated by the AOps |
| EX | Execute: This stage runs the execution units according to the AOps and the retrieved operands |
| WB | Write back: This stage stores the results of the execution in registers or in memory |

Referring back to FIG. 5, the pipeline stages noted above are performed by various functional blocks within microprocessor 110. Fetch unit 126 generates instruction addresses from the instruction pointer, by way of instruction microtranslation lookaside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution, As indicated in FIG. 5, operand unit 144 receives an input from scheduler 136 and also from microcode ROM 148, via multiplexer 145, and fetches register operands, and/or memory operands via load/store units $140_0$ and or $140_1$, for use in the execution of the instructions. In addition, according to this example, operand unit 144 performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 5, as well as the descriptions above such as those relating to the prior Figures, one skilled in the art may appreciate that system 34 of FIG. 2 may be incorporated in connection with various components shown in FIG. 5. For example, the writeback stage described above may be achieved by issuance of data from any of the five execution units of microprocessor 10 (two load-store units $140_0$, $140_1$, two ALUs $142_0$, $142_2$, and an FPU 130). As another example, any of the various caches shown in FIG. 5 may evict data to a combined storage queue such as queue 16 described above. Still further, various related functionality may be further performed by the appropriate circuitry within FIG. 5.

From the above, one skilled in art may appreciate numerous benefits of the present embodiments. For example, a microprocessor in accordance with the various embodiments may include a combined storage queue which stores both writeback and evicted cache information, and which dynamically adjusts the amount of resources available to store such information while ensuring some guaranteed amount of storage for each type of information. In addition, the shared resource reduces the overall amount of integrated circuit space and bus interfacing which would be required for two separate structures to separately store the same maximum amount of information. In addition, the above demonstrates various alternative embodiments included within the inventive scope. For example, other aspects are provided to optimize operation, such as prioritization of writeback information over evicted cache information. As another example, an indicator such as a dirty bit is disclosed to represent that information in the combined storage queue is the most recent information and that the higher level memory system(s) have not been updated with that most recent information. As still another example, write combining is provided by permitting writes to the combined storage queue without re-ordering the information stored in the queue. As still another example of the flexibility of the present embodiments, one skilled in the art is able to construct various different specific circuits to accomplish the above features and functionality. As yet another example, while the microprocessor of FIG. 5 depicts an exemplary microprocessor to benefit from the inventive embodiments, other microprocessor architectures could benefit as well. Indeed, these benefits and examples serve further to demonstrate that while the present embodiments have been described in detail, various substitutions, modifications or alterations could be made to the descriptions set forth above without departing from the inventive scope. Still further, in addition to the many options set forth above still other alternatives will be ascertainable by a person skilled in the art, and all of the above demonstrates the flexibility of the inventive scope which is defined by the following claims.

What is claimed is:

1. A microprocessor, comprising:
   a central processor unit core operable to write information during a write cycle;
   a cache circuit coupled to said central processor unit core and operable to evict information;
   a combined storage queue coupled to said central processor unit core and said cache circuit, comprising a set of logical storage blocks, wherein each of said set of logical storage blocks is operable to store information selected from either information written by said central processor unit core or information evicted by said cache circuits, said combined storage queue maintaining an indication whether information stored in a logical storage block is information written by said central processor unit core or information evicted by said cache circuit;
   selection circuitry for routing information written by said central processor unit core or information evicted by said cache circuit into said combined storage queue on a first-in-first-out basis, said selection circuitry:
      responsive to receiving additional information written by said central processor unit core and detecting that each of said set of logical storage blocks stores information, routing said additional information to be stored in said set of logical storage blocks and overwriting from said set of logical storage blocks a least recently stored block of evicted cache information, and
      responsive to receiving additional information evicted by said cache circuit and detecting that each of said set of logical storage blocks stores information, routing said additional information to be stored in said set of logical storage blocks and overwriting from said set of logical storage blocks a least recently stored block of evicted cache information.

2. The microprocessor of claim 1 and further comprising:
   a memory system higher in hierarchical level than said combined storage queue and for storing information, wherein said set of logical storage blocks storing information evicted by said cache circuit are mapped to locations in said memory system; and
   an indicator corresponding to said additional information and for representing that said additional information has been updated in said combined storage queue without updating a corresponding mapped location in said memory system.

3. The microprocessor of claim 2 and further comprising:
   circuitry, responsive to said indicator representing that said additional information has been updated in said combined storage queue without updating a corresponding mapped location in said memory system, for updating said corresponding mapped location in said memory system before said selection circuitry overwrites said least recently stored block of evicted cache information.

4. The microprocessor of claim 2 wherein, responsive to receiving additional information written by said central processor unit core and detecting that each of said set of logical storage blocks stores information, said selection circuitry routes said additional information to be stored in said set of logical storage blocks and overwrites from said set of logical storage blocks a least recently stored block of evicted cache information having said indicator representing that said additional information has been updated in said combined storage queue and said corresponding mapped location in said memory system has been updated.

5. The microprocessor of claim 1 and further comprising:
   a memory system higher in hierarchical level than said combined storage queue and for storing information, wherein said set of logical storage blocks storing information evicted by said cache circuit are mapped to locations in said memory system; and an indicator corresponding to said additional information and for representing that said additional information has been updated in said combined storage queue without updating a corresponding mapped location in said memory system.

6. The microprocessor of claim 1:
further comprising selection circuitry for routing information written by said central processor unit core for storage into said set of logical storage blocks;
wherein each of said set of logical storage blocks is operable to store information equal to or less than a predetermined number of bytes;
wherein, responsive to receiving additional information written by said central processor unit core less than said predetermined number of bytes, said selection circuitry determines whether said combined storage queue is already storing a corresponding block of information which maps to a same block address as said additional information; and
wherein, responsive to said selection circuitry determining that said combined storage queue is already storing said corresponding block of information, said selection circuitry routes said additional information to overwrite selected bytes of said corresponding block of information.

7. The microprocessor of claim 6 and further comprising circuitry for reading said corresponding block of information from said combined storage queue and thereafter writing said corresponding block of information to a memory system higher in hierarchical level than said combined storage queue after said selection circuitry routes said additional information to overwrite selected bytes of said corresponding block of information.

8. A microprocessor, comprising:
a central processor unit core operable to write information during a write cycle;
a cache circuit coupled to said central processor unit core and operable to evict information;
a combined storage queue coupled to said central processor unit core and said cache circuit, comprising a set of logical storage blocks, wherein each of said set of logical storage blocks is operable to store information selected from either information written by said central processor unit core or information evicted by said cache circuit;
wherein said set of logical storage blocks comprises a first set of logical storage blocks operable to store both information written by said central processor unit core and information evicted by said cache circuit; and
wherein said combined storage queue further comprises:
a second set of logical storage blocks, wherein each of said second set of logical storage blocks is operable to store only information written by said central processor unit core; and
a third set of logical storage blocks, wherein each of said third set of logical storage blocks is operable to store only information evicted by said cache circuit.

9. The microprocessor of claim 8 and further comprising selection circuitry for routing information written by said central processor unit core for storage into said second and first sets of logical storage blocks on a first-in-first-out basis such that said information logically routes firstly into said second set of logical storage blocks and secondly from said second set of logical storage blocks to said first set of logical storage blocks.

10. The microprocessor of claim 8 and further comprising selection circuitry for routing information evicted by said cache circuit for storage into said third and first sets of logical storage blocks on a first-in-first-out basis such that said information logically routes firstly into said third set of logical storage blocks and secondly from said third set of logical storage blocks to said first set of logical storage blocks.

11. The microprocessor of claim 8 and further comprising:
selection circuitry for routing information written by said central processor unit core for storage into said second and first sets of logical storage blocks on a first-in-first-out basis such that said information logically routes firstly into said second set of logical storage blocks and secondly from said second set of logical storage blocks to said first set of logical storage blocks; and
selection circuitry for routing information evicted by said cache circuit for storage into said third and first sets of logical storage blocks on a first-in-first-out basis such that said information logically routes firstly into said third set of logical storage blocks and secondly from said third set of logical storage blocks to said first set of logical storage blocks.

12. The microprocessor of claim 11 wherein, responsive to receiving additional information written by said central processor unit core and detecting that each of said first set of logical storage blocks stores information, said selection circuitry routes said additional information to be stored in said second set of logical storage blocks and overwrites from said first set of logical storage blocks a least recently stored block of evicted cache information.

13. The microprocessor of claim 11 wherein, responsive to receiving additional information evicted by said cache circuit and detecting that each of said first set of logical storage blocks stores information, said selection circuitry routes said additional information to be stored in said third set of logical storage blocks and overwrites from said first set of logical storage blocks a least recently stored block of evicted cache information.

14. The microprocessor of claim 11:
wherein, responsive to receiving additional information written by said central processor unit core and detecting that each of said first set of logical storage blocks stores information, said selection circuitry routes said additional information to be stored in said second set of logical storage blocks and overwrites from said first set of logical storage blocks a least recently stored block of evicted cache information; and
wherein, responsive to receiving additional information evicted by said cache circuit and detecting that each of said first set of logical storage blocks stores information, said selection circuitry routes said additional information to be stored in said third set of logical storage blocks and overwrites from said first set of logical storage blocks a least recently stored block of evicted cache information.

15. The microprocessor of claim 8:
further comprising selection circuitry for routing information written by said central processor unit core for storage into said second and first sets of logical storage blocks;
wherein each of said second and first sets of logical storage blocks is operable to store information equal to or less than a predetermined number of bytes;
wherein, responsive to receiving additional information written by said central processor unit core less than said predetermined number of bytes, said selection circuitry determines whether said combined storage queue is already storing a corresponding block of information which maps to a same block address as said additional information; and wherein, responsive to said selection circuitry determining that said combined storage queue is already storing said corresponding block of information, said selection circuitry routes said additional information to overwrite selected bytes of said corresponding block of information.

16. The microprocessor of claim 15 and further comprising circuitry for reading said corresponding block of information from said combined storage queue and thereafter writing said corresponding block of information to a memory system higher in hierarchical level than said combined storage queue after said selection circuitry routes said additional information to overwrite selected bytes of said corresponding block of information.

17. The microprocessor of claim 8 wherein each of said second set of logical storage blocks and said third set of logical storage blocks equals a same integer number of logical storage blocks.

18. The microprocessor of claim 8 wherein each of said second set of logical storage blocks and said third set of logical storage blocks equals four logical storage blocks.

19. The microprocessor of claim 8 wherein said first set of logical storage blocks equals twelve logical storage blocks.

20. The microprocessor of claim 8:
wherein each of said second set of logical storage blocks and said third set of logical storage blocks equals four logical storage blocks; and
wherein said first set of logical storage blocks equals twelve logical storage blocks.

21. A microprocessor, comprising:
a central processor unit core operable to write information during a write cycle;
a cache circuit coupled to said central processor unit core and operable to evict information;
a combined storage queue coupled to said central processor unit core and said cache circuit, comprising a set of logical storage blocks, wherein each of said set of logical storage blocks is operable to store information selected from either information written by said central processor unit core or information evicted by said cache circuit;
wherein said set of logical storage blocks comprises a first set of logical storage blocks operable to store both information written by said central processor unit core and information evicted by said cache circuit; and
wherein said set of logical storage blocks further comprises a second set of logical storage blocks, wherein each of said second set of logical storage blocks is operable to store only information written by said central processor unit core.

22. The microprocessor of claim 21 and further comprising selection circuitry for routing information written by said central processor unit core for storage into said second and first sets of logical storage blocks on a first-in-first-out basis such that said information logically routes firstly into said second set of logical storage blocks and secondly from said second set of logical storage blocks to said first set of logical storage blocks.

23. The microprocessor of claim 22 wherein, responsive to receiving additional information written by said central processor unit core and detecting that each of said first set of logical storage blocks stores information, said selection circuitry routes said additional information to be stored in said second set of logical storage blocks and overwrites from said first set of logical storage blocks a least recently stored block of evicted cache information.

24. The microprocessor of claim 21:
further comprising selection circuitry for routing information written by said central processor unit core for storage into said second and first sets of logical storage blocks;
wherein each of said second and first sets of logical storage blocks is operable to store information equal to or less than a predetermined number of bytes;
wherein, responsive to receiving additional information written by said central processor unit core less than said predetermined number of bytes, said selection circuitry determines whether said combined storage queue is already storing a corresponding block of information which maps to a same block address as said additional information; and
wherein, responsive to said selection circuitry determining that said combined storage queue is already storing said corresponding block of information, said selection circuitry routes said additional information to overwrite selected bytes of said corresponding block of information.

25. The microprocessor of claim 24 and further comprising circuitry for reading said corresponding block of information from said combined storage queue and thereafter writing said corresponding block of information to a memory system higher in hierarchical level than said combined storage queue after said selection circuitry routes said additional information to overwrite selected bytes of said corresponding block of information.

26. A microprocessor having an architected state, said microprocessor comprising:
a central processor unit core operable to write information during a write cycle, wherein said information is actual writeback information to affect said architected state of said microprocessor;
a cache circuit coupled to said central processor unit core and operable to evict information; and
a combined storage queue coupled to said central processor unit core and said cache circuit, comprising:
a first set of logical storage blocks, wherein each of said set of logical storage blocks is operable to store information selected from either said information written by said central processor unit core or information evicted by said cache circuit; and
a second set of logical storage blocks, wherein each of said second set of logical storage blocks is operable to store only said information written by said central processor unit core;
selection circuitry for routing said information written by said central processor unit core for storage into said first and second sets of logical storage blocks;
wherein each of said first and second sets of logical storage blocks is operable to store information equal to or less than a predetermined number of bytes;
wherein, responsive to receiving additional information written by said central processor unit core less than said predetermined number of bytes, said selection circuitry determines whether said combined storage queue is already storing a corresponding block of information which maps to a same block address as said additional information; and wherein, responsive to said selection circuitry determining that said combined storage queue is already storing said corresponding block of information, said selection circuitry routes said additional information to overwrite selected bytes of said corresponding block of information.

27. The microprocessor of claim 26 and further comprising selection circuitry for routing information written by said central processor unit core for storage into said second and first sets of logical storage blocks on a first-in-first-out basis such that said information logically routes firstly into said second set of logical storage blocks and secondly from said second set of logical storage blocks to said first set of logical storage blocks.

28. The microprocessor of claim 27 wherein, responsive to receiving additional information written by said central processor unit core and detecting that each of said first set of logical storage blocks stores information, said selection circuitry routes said additional information to be stored in said second set of logical storage blocks and overwrites from said first set of logical storage blocks a least recently stored block of evicted cache information.

29. The microprocessor of claim 26 and further comprising circuitry for reading said corresponding block of information from said combined storage queue and thereafter writing said corresponding block of information to a memory system higher in hierarchical level than said combined storage queue after said selection circuitry routes said additional information to overwrite selected bytes of said corresponding block of information.

30. A microprocessor, comprising:
a central processor unit core operable to write information during a write cycle, said information including actual information in response to execution of an instruction intended to take effect upon an architected state of the microprocessor and speculative information in response to a speculatively executed instruction;
a cache circuit coupled to said central processor unit core and operable to evict information;
a combined storage queue coupled to said central processor unit core and said cache circuit, comprising a set of logical storage blocks, wherein each of said set of logical storage blocks is operable to store information selected from either actual information written by said central processor unit core, speculative information written by said central processor unit core or information evicted by said cache circuit;
a memory system higher in hierarchical level than said combined storage queue and for storing information, wherein said set of logical storage blocks storing information evicted by said cache circuit are mapped to locations in said memory system; and
wherein said combined storage queue maintains an indication whether information written by said central processor unit core is actual information or speculative information; and
selection circuitry for routing information written by said central processor unit core or information evicted by said cache circuit into said combined storage queue on a first-in-first-out basis, responsive to receiving additional information written by said central processor unit core or information evicted by said cache circuit and upon determining that information written by said central processor unit core stored in a particular logical block is to be evicted said selection circuitry:
evicting said information and writing said information to said higher level memory system if said information is actual information, and
evicting said information without writing to said higher level memory system if said information is speculative information.

31. The microprocessor of claim 30, wherein:
responsive to receiving additional information written by said central processor unit core said selection circuitry determines whether said combined storage queue is already storing a corresponding block of information which maps to a same block address as said additional information,
routes said additional information to overwrite said corresponding logical storage block if said corresponding information is actual information, and
routes said additional information to another logical storage block if said corresponding information is speculative information.

32. The microprocessor of claim 30 wherein said circuitry for indicating that said information written by said central processor unit core is speculative information written by said central processor unit is operable to further indicate that said information written by said central processor unit core is converted from speculative information to actual information in response to completion of an instruction corresponding to said speculative information.

* * * * *